United States Patent [19]

King et al.

[11] Patent Number: 4,960,484
[45] Date of Patent: Oct. 2, 1990

[54] SINGLE-SIDE LAMINATOR

[75] Inventors: Michael T. King, Palatine; Neal E. Petges, Chicago, both of Ill.

[73] Assignee: General Binding Corporation, Northbrook, Ill.

[21] Appl. No.: 302,086

[22] Filed: Jan. 26, 1989

Related U.S. Application Data

[63] Continuation of Ser. No. 119,718, Nov. 12, 1987, abandoned.

[51] Int. Cl.$^5$ .............................................. B32B 31/00
[52] U.S. Cl. .................................. 156/499; 156/555; 156/582
[58] Field of Search ........................................ 156/499

[56] References Cited

U.S. PATENT DOCUMENTS

| | | | |
|---|---|---|---|
| 1,880,451 | 10/1932 | Hopkins | 162/197 |
| 3,649,447 | 5/1972 | Turner | 162/197 |
| 3,661,703 | 5/1972 | Shelor | 162/271 |
| 3,962,957 | 6/1976 | Hinzmann | 162/271 |
| 3,971,696 | 7/1976 | Manfredi | 162/271 |
| 3,996,842 | 12/1976 | Ehlich | 162/271 |
| 4,268,345 | 5/1981 | Semchuck | 156/555 |
| 4,470,589 | 9/1984 | Singer | 156/324 |
| 4,517,042 | 5/1985 | Singer | 156/555 |

Primary Examiner—George F. Lesmes
Assistant Examiner—J. Davis
Attorney, Agent, or Firm—Hill, Van Santen, Steadman & Simpson

[57] ABSTRACT

There is disclosed herein an attachment for a laminating machine. The attachment permits one-sided lamination by adjustably imparting a reverse curling force to an initially curled laminate. The reverse curling force is imparted by bending and/or stretching the heated and laminated product before the film sets so as to offset the initial curl. This is done by drawing the laminated product over a bar edge and adjusting the draw with an adjustable roller.

1 Claim, 1 Drawing Sheet

SINGLE-SIDE LAMINATOR

This is a continuation of application Ser. No. 119,718, filed Nov. 12, 1987 now abandoned.

BACKGROUND OF THE INVENTION

This invention relates to heat laminating devices and particularly to a device for use in one-sided or single-sided lamination.

In many applications it is desirable to heat laminate a clear plastic protector film to an unprotected underlying sheet for protecting the text material, etc., on the underlying sheet. The underlying sheet is referred to as the product, and the laminated product (i.e., sheet and film) is referred to as the web. The web is subsequently cut into individual pages, covers, etc.

The protector film can be applied to both sides of the underlying or unprotected product in order to protect text on both sides of the product and to offset the shrinkage of one protector film on one side with the shrinkage of the protector film on the other side. In other words, by laminating on both sides, the various forces are balanced or offset and the resulting web (i.e., product and film) is substantially planar or flat.

However, in some applications it is only necessary to protect one side of a product and only one protector film need be laminated to the product. Until now, such one-sided heat lamination has resulted in an initial curl on the laminating film side, resulting from shrinkage, etc., of the laminating film. This initial curl is undesirable and it is desirable that the laminated product be substantially flat or even have a slight reverse curl. The initial curl has resulted in products that are not as desirable as the two-sided laminations and/or in selecting more expensive alternatives.

It is an object of this invention to provide a device for use in producing one-sided laminates that are substantially flat or even have a slight reverse curl.

It is another object to provide a one-side laminating device as an attachment for existing laminating machines.

These and other objects of this invention will be apparent from the following description and appended claims.

SUMMARY OF THE INVENTION

There is provided herein an attachment for a heat laminating machine for applying a reverse curling force to a one-side laminated product so as to produce a one-side laminated product that is substantially flat or has a slight reverse curl. The reverse curling force offsets the initial curl resulting from the initial laminating so as to produce the one-side laminated product or web.

The attachment includes a bar over which the laminated product is drawn with the product positioned against the bar and a heated protecting film spaced therefrom so as to apply the reverse curling force.

The reverse curling force is applied by the bar and an adjustable roller which cooperates in directing the laminated product against the bar and drawing the initially laminated product against the bar to apply the reverse curling force.

DESCRIPTION OF THE PREFERRED EMBODIMENT

Figure 1:
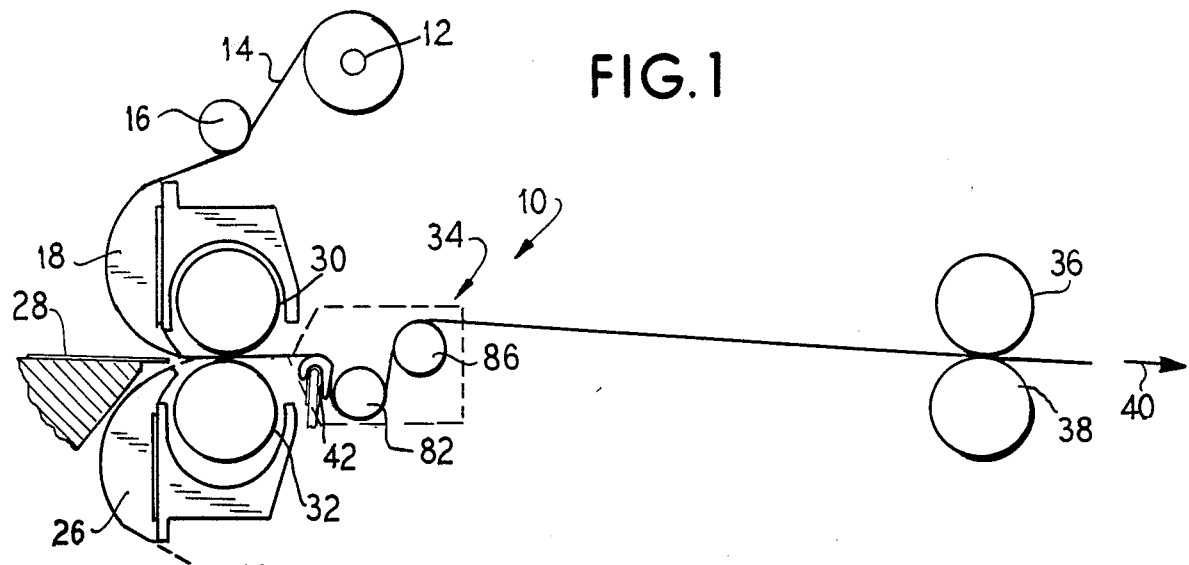
FIG. 1 is a diagrammatic view of a laminating machine with the reverse curling attachment of this invention.
Figure 3:
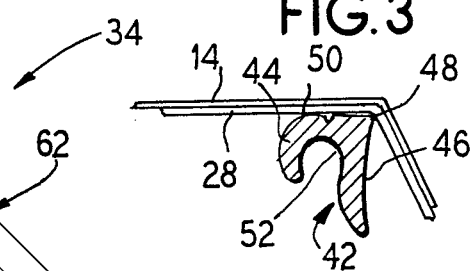
FIG. 3 is a cross-sectional view of a bar for the reverse curling attachment taken along line 3—3 of FIG. 2.

Referring to FIG. 1, a diagrammatic view of a laminating machine 10 is shown.

The machine includes a film supply in the form of a roller 12 which carries laminating film or web 14, which is a heatable plastic that is bondable to a paper web or sheet (i.e., the product) as is known in the art.

The film 14 extends from the supply, past a guide roller 16 to a curved heat shoe 18. The shoe 18 heats the film to a bonding temperature which is dependent on transit time over the shoe and film characteristics.

In two-sided copying, a second supply of film is provided. This second supply includes a roller 20 about which a web 22 of film is wound. The web extends from the roller 20 to a guide roller 24 and to a second heat shoe 26.

The product 28 (usually paper in sheet form) is delivered to the laminator as shown.

In two-sided lamination, the product 28 is laminated on each side with film such as 14 and 22.

In one-sided lamination, the bottom film supply is deactivated as, for example, by cutting the film 22, deactivating the heat shoe 26, and/or deactivating the roller 20.

In one-sided laminating, the film 14 and the product 28 are laminated by pressing them together with the nip rollers 30 and 32. The nip rollers press the film and product together for bonding to each other. Thus the separate product 28 and film 14 enter the rollers and a heated and one-side laminated product in web form (i.e., product and film) exits the rollers.

Upon heating the film stretches and on cooling contracts or shrinks more than the paper product, thus causing the one-side laminated product to initially curl toward the film side.

This initial curl is offset by a reverse curling force applied in the one-side laminating attachment 34, which receives the heated and laminated product from the nip rollers 30 and 32. The pull rollers 36 and 38 draw one-side laminated product from the nip rollers 30 and 32 through the attachment 34 and to the rollers 36 and 38 in the direction shown by the arrow 40. The web or one-side laminated product is delivered to auxiliary equipment (not shown), such as a cutter for cutting laminated sheets.

Figure 2:
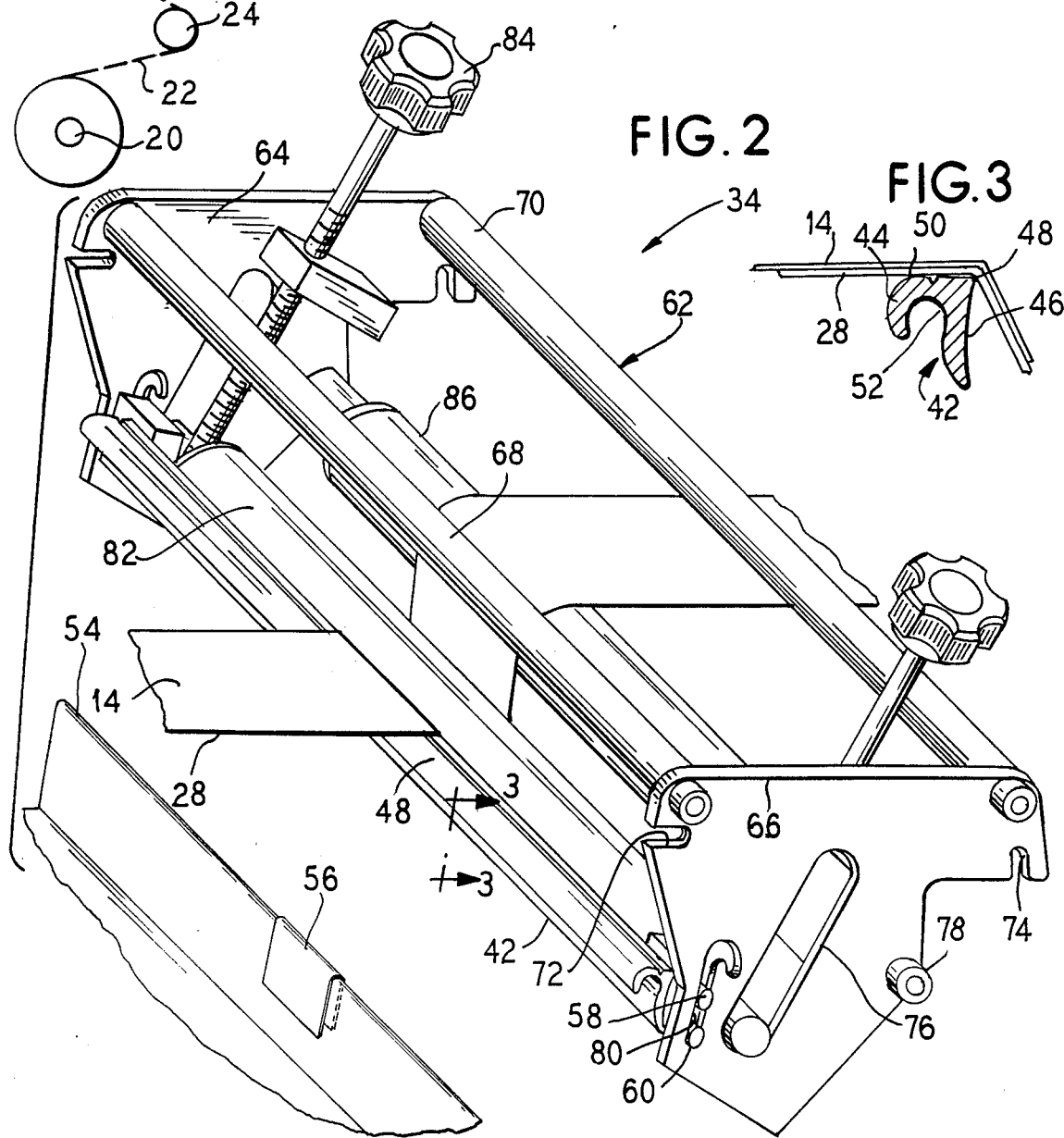
FIG. 2 is a perspective-style view of the reverse curling attachment of this invention.

The attachment 34 is best seen in FIG. 2. The heated, pressed and laminated product or web is drawn into the attachment 34. The attachment includes an elongated bar 42, which is referred to as a breaker bar, that extends transverse to the web (i.e., film and product) so that the web passes across or extends over the breaker bar.

The bar may be extruded and includes a curved downwardly extending front leg 44, a downwardly extending rear leg 46, a reverse curling edge 48 at the back edge of the bar, and a top surface 50.

As is seen, the bar is generally J-shaped and the front leg 44, top surface 50 and rear leg 46 define an inner recess or bight 52. The bight engages, for mounting purposes, a flange 54 on the machine. If desired, the flange 54 may include a centrally-positioned clip 56 for imparting a curve or crown to bar 42.

The bar's curling edge 48 may be hard anodized for wear purposes. Mounting pins, such as 58 and 60, are also provided on the bar 42 at each end thereof.

The attachment 34 also includes a roller housing 62 formed by a pair of side plates 64 and 66, which are joined to each other by the shafts 68 and 70. Each plate has: a horizontal slot, such as 72, and a vertical slot, such as 74, for connection to a frame or to the machine; an elongated adjustable roller mounting slot, such as 76; a stationary roller mount, such as 78; and an inverted J-shaped breaker bar mounting slot 80.

The slot 80 cooperates with the mounting pins, such as 58 and 60, to form a downward operative and flange engaging position and an upper installing position where the mounting pins are at the bight of the J for installing the attachment 34 in a laminating machine.

An adjustable roller 82 is adjustably mounted to the elongated slot, such as 76, for adjustment relative to the breaker bar 42 by the threaded adjusters, such as 84. The adjusters are threadably connected to the side plates and the roller. It is seen that the adjustable roller 82 is positioned rearwardly or downstream of the breaker bar 42 and generally parallel thereto. The web extends over the breaker bar and below the roller 82 so that the roller can cooperate in directing the web against the breaker bar edge 48. When the adjustable roller 82 is in its furthest downward position as shown, the maximum force is exerted for drawing the web against the bar edge. This would be used to impart the maximum reverse curling force.

A substantially flat or slight reverse curl shape is imparted by stretching the film 14 while it is still warm and before it has set or shrunk from the initial heating and pressing operation. The amount of force, stretch and reverse curling force is adjusted by adjusting the position of the roller 82 relative to the breaker bar. This adjustment changes the tension and angle at which the web is drawn over the bar edge 48, and hence the amount of set or reverse curling force.

When none or very little reverse curling force is to be imparted, the roller 82 is adjusted to the top of slot 76, and the web passes over the bar edge 48.

The reverse curled web is trained over or passes over the stationary roller 86 for alignment with the pull rollers 36 and 38.

In review, protective laminating film 14 is drawn from the supply 12 over heat shoe 18, and both the heated film and product are fed into the nip rollers 30 and 32 where they are pressed together and bonded to each other. This can impart an initial curl to the film side of the laminate. To offset this initial curl, the film is reverse curled in the attachment 34. Here the initially curled web is drawn over the bar edge 48 and the amount of reverse curling force is dependent upon the bend and stretching over the bar edge 48, which is controlled by the positioning of an adjustment roller 82 about which the web is trained. From there, the web is drawn over a stationary guide roller 86 to a pair of pull rollers.

Although the invention has been described with respect to preferred embodiments, it is not to be so limited as changes and modifications can be made which are within the full intended scope of the invention as defined by the appended claims.

We claim as our invention:

1. An attachment for a machine for heat laminating a protective film to one side of an underlying product to be protected, which machine includes;
    roller means for dispensing laminating protective film;
    heat shoe means over which film is drawn for heating laminating film to a predetermined laminating temperature;
    means for dispensing unprotected product to be protected by laminating;
    nip roller means for laminating film and product together with the film on one side and product on the other side of the laminate, said laminate forming a web having an initial curl; and
    pull roller means for drawing laminated web from said nip roller means for directing laminated web from said machine;
wherein the improvement comprises:
    one-side laminate attachment means downstream of said nip roller means and upstream of said pull roller means for receiving laminated web from said nip roller means, said attachment means, including: a stationary bar over which laminated web is drawn for applying a reverse curling force to laminated web; adjustable roller means around which laminated web from said bar means is trained for cooperation in adjustably drawing laminated web from the adjustable roller means and directing laminated web from said attachment means toward said pull roller means;
said attachment means also including;
    a pair of spaced attachment side plates for mounting cooperating with said machine, for carrying said adjustable roller means, and for carrying said stationary roller means; and
    adjustment means mounted to said attachment plates and to said adjustable roller means for adjusting the position of the adjustable roller means in relation to the stationary bar so as to adjust the position of a laminated web relative to said stationary bar and the reverse curling force applied to the laminated web;
wherein said side plates each define an inverted J-shaped slot having a pair of legs and a bight, and the stationary bar includes at each end a pair of spaced mounting pins, said pins adapted to be received in the respective inverted J-shaped slot, wherein the pins are movable in the legs and bight of the slots between an operative position and an installation position.

* * * * *